Patented Mar. 3, 1936

2,032,452

UNITED STATES PATENT OFFICE 2,032,452

MANUFACTURE OF RUBBER ARTICLES

Douglas Frank Twiss, Sutton Coldfield, England, assignor to American Anode Incorporated, Akron, Ohio, a corporation of Delaware No Drawing. Original application February 19, 1931, Serial No. 517,099. Divided and this application February 26, 1935, Serial No. 8,370. In Great Britain October 22, 1926

5 Claims. (Cl. 18—58)

This invention relates to the manufacture of articles of rubber or the like directly from the latex or from similar aqueous dispersions containing the rubber or other like substance.

The objects of this invention include the manufacture of articles or coatings by a process of direct coagulation of rubber from an aqueous dispersion thereof on the surface of a form, and particularly such manufacture by an improved process whereby the coagulation of the rubber is effected in an economical, readily controlled process involving the minimum of manipulation.

This invention consists broadly in coating an impervious form with a film of a liquid coagulant, and thereafter associating the coagulant-coated form with an aqueous dispersion of rubber or the like, the rubber being coagulated as a firm, coherent layer on the surface of the form. The coagulant film should preferably have a consistency great enough to prevent any appreciable displacement of the coagulant during the handling of the form prior to its association with the rubber dispersion or during its actual contact therewith. This increased consistency of the coagulant may, for example, be effected by cooling it. In one embodiment of the invention the consistency of the coagulant film is increased to the point of solidification by supercooling, or gelation, or even complete crystallization by lowering its temperature before the form is immersed in the latex or other dispersion. However, it is preferred to avoid crystallization of the coagulant, for a crystallized film is not as homogeneous and does not possess as smooth a surface as a non-crystalline film.

The forms or bases employed in the practice of this invention may be made of any substance which is impervious to water and to the particular coagulant which is employed. Forms of glass, glazed porcelain, stainless steel, or aluminum are particularly suitable for the manufacture of ordinary rubber articles which are to be stripped from the forms, although other compositions such as wood, molded plastics, or even hard or soft vulcanized rubber, may sometimes be employed. Permanent coatings of soft or hard rubber are readily applied by the method of this invention to articles of wood, metal, etc., of simple or intricate shape, the said articles preferably being first coated with a suitable adhesive which is impervious to water and to the coagulant.

The coagulants may be pure liquid acids or coagulating salts, or solutions of solid or liquid acids or salts in water or other appropriate solvents, or mixtures of several coagulants. For example, pure formic, acetic or lactic acid, or solutions of these acids or of other strong organic acids such as oxalic, malonic or citric acid, or of the non-oxidizing mineral acids such as hydrochloric, sulphuric or phosphoric acids, may be employed as coagulants.

If it is preferred to employ a substantially neutral coagulant, solutions of polyvalent metal salts such as calcium chloride, calcium lactate, calcium nitrate, calcium perchlorate, magnesium chloride, magnesium sulphate, aluminum sulphate, cadmium sulphate, lead acetate, zinc chloride, or zinc sulphate are suitable; whereas if an acid coagulant is preferred, any of the above-mentioned salts may be mixed with a solution of an acid which does not react therewith to form insoluble or otherwise undesirable products, or an acid salt such as alum, sodium dihydrogen phosphate or sodium hydrogen sulphate may be substituted therefor.

Coagulants which are only sparingly soluble, such as calcium sulphate or sodium silicofluoride, may likewise be employed, being suspended in a finely divided condition in a liquid medium, either with or without the addition of other more soluble coagulants.

The forms are coated with the liquid coagulants by any suitable means, such as spraying or brushing, although dipping in a bath of the liquid is ordinarily preferred because of its greater simplicity. If necessary, any excess coagulant, such as drops collecting on the lower portion of the form, may be removed by wiping, or distributed uniformly over the surface by inverting the form or rotating it about a horizontal axis.

The alternative embodiment of this invention, in which the coagulant film is solidified or congealed before the form is dipped in the latex or other equivalent dispersion, has advantages which sometimes outweigh the advantage of simplicity of operation of the permanently liquid coagulants enumerated above. In particular, the solidified coagulant film is not subject to flow, so that the thickness is maintained uniform, and so that the coagulant is not subject to displacement through contact with the rubber dispersion.

Such congealable coagulants include acids and coagulating salts which are solid at normal temperatures, but which melt at relatively low temperatures, preferably below the boiling point of water. For example, the following substances, each of which has a melting point between 30° C. and 100° C. may be employed; glacial phosphoric acid, selenic acid, trichloracetic acid, benzene sulphonic acid, glycollic acid, potassium dihydrogen phosphate, or hydrated salts which melt and dissolve in their own water of crystallization, such as sodium alum, aluminum nitrate, calcium nitrate, ferrous sulphate, zinc nitrate, or zinc sulphate. Any other acid or salt of a polyvalent metal which is solid at ordinary temperatures, but melts at a slightly elevated temperature, may be substituted for the substances enumerated above, or mixtures of such substances may be employed. These coagulants are maintained in a molten condition, the form being dipped in the liquid coagulant to provide it with a surface film of the coagulant, and thereafter being permitted to cool in order that the coagulant may solidify before the form is dipped in the latex. When the composition of the coagulant is properly chosen, it will solidify to a smooth, glassy film instead of crystallizing.

In another modification of the invention the coagulant is incorporated in a composition which is liquid at temperatures somewhat above the normal, but sets to a gel when it is cooled. For example, any of the coagulants mentioned above may be incorporated in a warm or hot solution of gelatine, agar-agar, or other gelatinous colloid in any proportions which will not inhibit gelation of the mixture. The soluble salts of the polyvalent metals such as calcium, magnesium, zinc, or aluminum are preferred, but acid salts or the acids themselves may be employed if the concentration of the respective constituents of the mixture are so adjusted that the acid does not prevent the gelation of the colloid. The forms are coated with these coagulant gels by immersing them in the heated, liquid composition and cooling them after withdrawal, until the coagulant composition sets to a gel. It is even possible to coat the forms with a film of a solution of sodium silicate (water glass), and to treat the liquid film with a strong acid such as a solution of sulphuric acid. The film of sodium silicate solution is thereby converted to a gel of colloidal silicic acid containing free sulphuric acid absorbed therein, the free acid being the active coagulant.

The rubber dispersion is preferably a vulcanizable natural rubber latex, but other coagulable aqueous dispersions of rubber or rubber-like substances such as the latices of gutta-percha or balata, or artificial aqueous dispersions of rubber, synthetic rubber, rubber substitutes, reclaimed rubber, artificial rubber isomers, etc., or even vulcanized rubber latex, may likewise be employed. Other solid or liquid ingredients such as pigments, fillers, softeners, vulcanizing agents, etc., may be incorporated in widely varying proportions, being preferably finely suspended in an aqueous medium before they are added to the dispersion of rubber. The dispersion may have any desired rubber content within such limits that a firm, coherent, well coagulated deposit is produced therefrom, but is preferably rather concentrated, a concentration of about 50 to 60% of dispersed constituents, including the rubber, being preferred. The more concentrated dispersions have the advantages of giving rise to more firmly coagulated deposits, and of containing less moisture which must subsequently be eliminated from the deposits by evaporation. If desired, ingredients such as common salt, sodium sulphate, or calcium sulphate, which have an incipient coagulating effect on the rubber dispersions may be added.

As a specific example of one embodiment of the invention, shaped articles such as tobacco pouches, bath caps, fountain pen sacs, etc., are made on molds of metal or glazed porcelain by dipping the molds in a concentrated aqueous solution of calcium chloride and wiping off the excess of the liquid. The forms with a film of coagulant on the surface are then dipped in a concentrated latex composition containing the following ingredients:

| | Parts by weight |
|---|---|
| Rubber (as ammonia-preserved latex) | 100 |
| Sulphur | 2 |
| Zinc oxide | 10 |
| Whiting | 5 |
| Cotton seed oil | 4 |
| Wax | 2 |
| Zinc pentamethylene dithiocarbamate | 1 |

The coagulant, diffusing out into the latex from the film on the surface of the form, coagulates a uniform layer of the rubber composition. The form is removed from the latex after about five minutes, the coagulated rubber is dried, vulcanized and stripped from the form. If a greater thickness of rubber is desired, the form is left in the latex for a longer period of time, and if a thinner deposit is desired, it is removed sooner.

In the manufacture of high grade rubber gloves such as are used for protection against acids, the forms of glazed porcelain in the shape of hands are immersed in a bath of molten calcium nitrate $(Ca(NO_3)_2.4H_2O)$. This salt melts and dissolves in its water of crystallization at about 42° C., but is preferably maintained at a slightly higher temperature, say between 50° C. and 60° C., by means of a hot water or steam jacket surrounding the coagulant bath. The form may be somewhat prewarmed before it is dipped in the coagulant, to prevent the coagulant from congealing immediately on the surface of the form. After the form is removed from the coagulant it is inverted or is rotated about a horizontal axis in order to effect a uniform distribution of the liquid coagulant on the surface of the form before it cools and solidifies.

The form with the film of solidified coagulant on the surface is then immersed in a vulcanizable latex which may be prepared by mixing the quantity of concentrated, ammonia-preserved latex which contains 100 parts by weight of rubber with dispersions containing 10 parts zinc oxide, 3 parts sulphur, 0.5 parts organic accelerator, and 1 part lampblack, the completed mixture containing about 50% water. The form is left in this latex composition for about 10 minutes, and is then removed with a uniform deposit of coagulated rubber on the surface. The deposits are washed in running water, dried, vulcanized, and stripped from the forms.

As an example of another embodiment of the invention, a football bladder is made in one piece on a suitably shaped form of hollow metal, a hole being left in the rubber for extracting the form and the hole being subsequently sealed by a patch containing the tube for inflating the bladder. The form is dipped in a solution of 10% of calcium nitrate and 1% of agar-agar in water, the solution being maintained at a temperature of about 90° C. to preserve it in a liquid state. The form, with a coat of this solution on its surface is then slowly rotated about a horizontal axis while it cools to room temperature and the coagulant film gels. The form with the film of gelled coagulant on its surface is then immersed to the proper level in a vulcanizable rubber latex where it is allowed to remain for 10 to 15 minutes. The coagulated rubber on the form is then washed, dried, vulcanized and finished in the usual manner.

The permanent coating of articles with rubber is also readily effected by the method of this invention. For example, the handles of tools, such as electricians' pliers, are coated with one of the known adhesives for securing rubber to metal, and are then dipped in a 50% solution of acetic acid, allowed to drain for a short time, and then dipped in a rubber dispersion such as one of the latex compositions described above. If it is desired, the proportion of sulphur in the latex composition may be increased, so that the coating may be vulcanized to hard rubber. The coagulated rubber coating on the articles is dried and vulcanized, the vulcanization preferably being carried out under a high pressure which is maintained until the vulcanization is complete and the article cooled, in order to minimize the chance of blisters forming between the rubber and the metal.

This application is a division of my copending application Serial No. 517,099 filed February 19, 1931, which is a continuation in part of my copending applications Serial No. 220,845, filed September 20, 1927, and Serial No. 294,317, filed July 20, 1928.

While I have herein disclosed with considerable particularity certain preferred manners of performing my invention, I do not thereby desire or intend to limit myself solely thereto, for, as hitherto stated, the procedure may be modified, the precise proportions of the materials utilized may be varied, and other materials having equivalent properties may be employed if desired without departing from the spirit and scope of the invention as defined in the appended claims.

I claim:

1. A method of forming a deposit of rubber from an aqueous dispersion of rubber which comprises dipping a form having a surface of a coagulant material into a dispersion of rubber containing materials having an incipient coagulating effect on the dispersion.

2. The method of claim 1 in which the form is composed of coagulant material.

3. The method of claim 1 in which the form has a surface of vitreous coagulant material.

4. A method of forming a deposit of rubber from an aqueous dispersion of rubber which comprises coating a form with a film of coagulant and dipping the coated form into dispersion of rubber containing materials having an incipient coagulating effect on the dispersion.

5. A method of forming a deposit of rubber from an aqueous dispersion of rubber which comprises providing a form with a film of a solid coagulant material and dipping the coated form into a dispersion of rubber containing materials having an incipient coagulating effect on the dispersion.

DOUGLAS FRANK TWISS.